US011772655B2

(12) United States Patent
Choi

(10) Patent No.: US 11,772,655 B2
(45) Date of Patent: Oct. 3, 2023

(54) ADVANCED DRIVER ASSISTANCE SYSTEM, VEHICLE HAVING THE SAME, AND METHOD OF CONTROLLING VEHICLE

(71) Applicant: MANDO CORPORATION, Pyeongtaek-si (KR)

(72) Inventor: Jaebum Choi, Yongin-si (KR)

(73) Assignee: HL Klemove Corp., Incheon (KR)

( * ) Notice: Subject to any disclaimer, the term of this patent is extended or adjusted under 35 U.S.C. 154(b) by 176 days.

(21) Appl. No.: 17/133,838

(22) Filed: Dec. 24, 2020

(65) Prior Publication Data

US 2021/0197825 A1 Jul. 1, 2021

(30) Foreign Application Priority Data

Dec. 26, 2019 (KR) .......................... 10-2019-0175458

(51) Int. Cl.
*B60W 40/072* (2012.01)
*B60W 30/18* (2012.01)
(Continued)

(52) U.S. Cl.
CPC ...... *B60W 30/18163* (2013.01); *B60W 10/20* (2013.01); *B60W 30/09* (2013.01); (Continued)

(58) Field of Classification Search
CPC .......... B60W 30/18163; B60W 10/20; B60W 30/09; B60W 30/0956; B60W 40/072; (Continued)

(56) References Cited

U.S. PATENT DOCUMENTS

2014/0044311 A1* 2/2014 Takahashi ............ G06V 20/588
382/103
2017/0106861 A1* 4/2017 Oh ...................... B60W 30/143
(Continued)

FOREIGN PATENT DOCUMENTS

EP 2704122 A1 3/2014
JP WO2012-147187 A1 7/2014
(Continued)

OTHER PUBLICATIONS

Office Action issued in corresponding Korean Patent Application No. 10-2019-0175458, dated Feb. 4, 2021.
(Continued)

*Primary Examiner* — Peter D Nolan
*Assistant Examiner* — Ashley L Redhead, Jr.
(74) *Attorney, Agent, or Firm* — Morgan, Lewis & Bockius LLP

(57) ABSTRACT

A method of controlling a vehicle includes obtaining, by a camera, an image of a road ahead; recognizing, by a controller, a curvature of a front lane from the road image and obtaining position and speed information of another vehicle based on obstacle information detected by an obstacle detector; periodically storing, by a storage, driving speed information, yaw rate information, and steering angle information while driving; recognizing, by the controller, a curvature of a rear lane based on the driving speed information, yaw rate information, and steering angle information in response to determining that a lane change is necessary; determining, by the controller, a lane change possibility based on the curvature of the front lane, the curvature of the rear lane, and the position speed information of the other vehicle; and controlling, by the controller, at least one of steering, deceleration, and acceleration based on the lane change possibility.

20 Claims, 7 Drawing Sheets

(51) Int. Cl.
*B60W 30/09* (2012.01)
*B60W 40/114* (2012.01)
*B60W 50/14* (2020.01)
*B60W 10/20* (2006.01)
*B60W 30/095* (2012.01)
*G06V 20/58* (2022.01)
*G06V 20/56* (2022.01)

(52) U.S. Cl.
CPC ...... *B60W 30/0956* (2013.01); *B60W 40/072* (2013.01); *B60W 40/114* (2013.01); *B60W 50/14* (2013.01); *G06V 20/58* (2022.01); *G06V 20/584* (2022.01); *G06V 20/588* (2022.01); *B60W 2050/143* (2013.01); *B60W 2050/146* (2013.01); *B60W 2540/18* (2013.01); *B60W 2554/802* (2020.02); *B60W 2554/804* (2020.02)

(58) Field of Classification Search
CPC ............... B60W 40/114; B60W 50/14; B60W 2050/143; B60W 2050/146; B60W 2540/18; B60W 2554/802; B60W 2554/804; B60W 2552/30; B60W 2552/53; B60W 2520/14; B60W 2554/4041; B60W 2554/4042; B60W 2556/50; B60W 2710/207; B60W 2720/14; B60W 30/095; B60W 2554/4043; B60W 2554/801; B60W 10/18; B60W 40/105; B60W 2420/42; B60W 2420/52; B60W 2520/10; G06V 20/58; G06V 20/584; G06V 20/588; B60Y 2300/08
See application file for complete search history.

(56) References Cited

U.S. PATENT DOCUMENTS

| | | | | |
|---|---|---|---|---|
| 2017/0309181 | A1* | 10/2017 | Lee | B60Q 5/006 |
| 2017/0349173 | A1* | 12/2017 | Nishiguchi | B60W 60/00 |
| 2018/0158338 | A1* | 6/2018 | Kawaguchi | B60W 50/14 |
| 2019/0291728 | A1* | 9/2019 | Shalev-Shwartz | B60W 30/0956 |
| 2020/0108837 | A1* | 4/2020 | Kim | B60W 30/18145 |
| 2020/0180638 | A1* | 6/2020 | Kanoh | B60W 30/095 |
| 2020/0331476 | A1* | 10/2020 | Chen | G05D 1/0088 |

FOREIGN PATENT DOCUMENTS

| | | |
|---|---|---|
| JP | 2017-091094 A | 5/2017 |
| JP | 2018-177179 A | 11/2018 |
| KR | 2008-0004835 A | 1/2008 |
| KR | 10-1075615 B1 | 10/2011 |
| KR | 10-2013-0005176 A | 1/2013 |
| KR | 10-2018-0105592 A | 9/2018 |
| WO | 2017/138513 A1 | 8/2017 |

OTHER PUBLICATIONS

Korean Office Action dated Jan. 2, 2023, issued in corresponding Korean Patent Application No. 10-2021-0073468 with Machine English Translation.

* cited by examiner

ADVANCED DRIVER ASSISTANCE SYSTEM, VEHICLE HAVING THE SAME, AND METHOD OF CONTROLLING VEHICLE

CROSS-REFERENCE TO RELATED APPLICATION(S)

This application is based on and claims priority under 35 U.S.C. § 119 to Korean Patent Application No. 10-2019-0175458, filed on Dec. 26, 2019, the disclosure of which is incorporated herein by reference.

BACKGROUND

1. Field

The disclosure relates to an advanced driver assistance system that recognizes a lane and controls a lane change based on a position of the recognized lane, a vehicle having the same, and a method of controlling the vehicle.

2. Description of Related Art

In recent years, in order to prevent accidents caused by driver error, various advanced driver assistance systems (ADAS) have been developed that transmit driving information of a vehicle to a driver or perform autonomous driving for the driver's convenience.

As an example, there is a technology that detects obstacles around the vehicle by mounting a distance sensor on the vehicle and warns the driver.

As another example, a distance to another vehicle is obtained through an electromagnet mounted on a bumper of the vehicle, and if the obtained distance to another vehicle is within a certain distance, it is determined as a collision situation and power is supplied to the electromagnet to generate a magnetic force. There is a technology that allows the vehicle to automatically brake in the collision situation.

As another example, there is an autonomous driving control technology that allows the vehicle to recognize a road environment by itself, determine the obstacle and a driving situation, and control the driving of the vehicle according to a planned driving path based on the position information while avoiding an obstacle such that the vehicle automatically drives to the destination.

An autonomous driving control device for performing such autonomous driving control technology may recognize changes in obstacles and lanes, and may generate a path for avoidance driving in real time. In this case, in order to perform autonomous driving more stably on an actual road, it was important to determine collisions with surrounding static and dynamic objects and avoid driving according to the determination result.

SUMMARY

An aspect of the disclosure provides an advanced driver assistance system capable of recognizing a rear lane and controlling a lane change based on information about the recognized rear lane and obstacle recognition information, a vehicle having the same, and a method of controlling the vehicle.

An aspect of the disclosure provides an advanced driver assistance system capable of determining a driving state of a vehicle based on at least one of a yaw rate, a driving speed, and a steering angle, and recognizing the rear lane based on information about the determined driving state, a vehicle having the same, and a method of controlling the vehicle.

Additional aspects of the disclosure will be set forth in part in the description which follows and, in part, will be obvious from the description, or may be learned by practice of the disclosure.

According to an aspect of the disclosure, there is provided an advanced driver assistance system including: an image sensor configured to obtain an image of a road and output image data; a non-image sensor including a LiDAR sensor and a radar sensor; a communication network configured to receive driving data of a vehicle; and a controller including a processor configured to process the image data, obstacle data, and data detected by the non-image sensor. The controller may be configured to obtain position information of another vehicle based on data detected by the non-image sensor, recognize a curvature of a front lane based on the image data, recognize a curvature of a rear lane based on the driving data, determine a lane change possibility of the vehicle based on the recognized curvature of the front lane, the recognized curvature of the rear lane, and the position information of another vehicle, and control an output of a steering control signal based on the determined lane change possibility.

In response to determining that a lane change of the vehicle is impossible, the controller may be configured to obtain speed information of the other vehicle and control an output of a deceleration control signal or an acceleration control signal based on the obtained speed information of the other vehicle.

In response to determining that a lane change of the vehicle is impossible, the controller may be configured to control an output of notification information for collision avoidance.

The controller may be configured to obtain a target steering angle based on a target yaw rate obtained in advance and a yaw rate detected by a yaw rate detector, and generate the steering control signal corresponding to the obtained target steering angle.

The controller may be configured to obtain the speed information of the other vehicle, obtain a time to collision (TTC) with the other vehicle based on the obtained speed information and position information, and in response to the obtained TTC being greater than or equal to a predetermined reference time, determine that a lane change is possible.

The controller may be configured to obtain the speed information of the other vehicle, obtain a distance to collision (DTC) with the other vehicle based on the obtain speed information, and in response to the obtained DTC being greater than or equal to a predetermined reference distance, determine that a lane change is possible.

The controller may be configured to obtain a distance to the other vehicle based on the obtained speed information and position information, obtain a lane changeable distance based on a moving distance by reaction time, a moving distance by deceleration, and a safety distance, and in response to the obtained distance exceeding the lane changeable distance, determine that a lane change is possible.

According to another aspect of the disclosure, there is provided a vehicle including: a camera configured to obtain an image of a road ahead and output image data; an obstacle detector configured to detect an obstacle and output obstacle data; a driving information detector configured to detect driving information of a vehicle; a controller configured to recognize a curvature of a front lane based on the image data, recognize a curvature of a rear lane based on the driving information, determine a lane change possibility based on the recognized curvature of the front lane, the recognized curvature of the rear lane, and the obstacle data, and control at least one of steering, deceleration and acceleration based on the determined lane change possibility; a steering device configured to perform steering in response to a command of the controller; a braking device configured to perform deceleration in response to the command of the controller; and an engine configured to perform acceleration in response to the command of the controller.

The controller may be configured to obtain position information of another vehicle based on the obstacle data, and based on the recognized curvature of the front lane, the recognized curvature of the rear lane, and the position information of the other vehicle, determine whether a lane on which the other vehicle is driving is the same as a lane to be changed.

The controller may be configured to obtain the position information of the other vehicle driving on another lane based on the obstacle data, obtain one of a time to collision (TTC) with the other vehicle, a distance to collision (DTC) with the other vehicle, or a lane changeable distance based on the obtained position information of the other vehicle as information for determining a possibility of collision with the other vehicle.

The controller may be configured to, in response to determining that the other vehicle is driving in another lane ahead, obtain speed information of the other vehicle, based on the obtained speed information and position information, obtain the TTC with the other vehicle, and in response to the obtained TTC being greater than or equal to a predetermined reference time, determine that a lane change is possible.

The controller may be configured to, in response to determining that the other vehicle is driving in the same position in a transverse direction but driving in another lane, obtain the speed information of the other vehicle, obtain a distance to collision (DTC) with the other vehicle based on the obtain speed information, and in response to the obtained DTC being greater than or equal to a predetermined reference distance, determine that a lane change is possible.

The controller may be configured to, in response to determining that the other vehicle is driving in another lane in the rear, obtain speed information of the other vehicle, obtain a distance to the other vehicle based on the obtained speed information and position information, obtain a lane changeable distance based on a moving distance by reaction time, a moving distance by deceleration, and a safety distance, and based on the obtained distance exceeding the lane changeable distance, determine that a lane change is possible.

In response to determining that a lane change of the vehicle is impossible, the controller may be configured to obtain speed information of the other vehicle and control an output of a deceleration control signal or an acceleration control signal based on the obtained speed information of the other vehicle.

The vehicle may further include at least one of a display and a sound output. In response to determining that a lane change of the vehicle is impossible, the controller may be configured to control at least one of the display and the sound output to control an output of notification information for collision avoidance.

According to another aspect of the disclosure, there is provided a method of controlling a vehicle including: obtaining, by a camera, an image of a road ahead; recognizing, by a controller, a curvature of a front lane from the obtained road image; obtaining, by the controller, position information and speed information of another vehicle based on obstacle information detected by an obstacle detector; periodically storing, by a storage, driving speed information, yaw rate information, and steering angle information while driving; recognizing, by the controller, a curvature of a rear lane based on the periodically stored driving speed information, yaw rate information, and steering angle information in response to determining that a lane change is necessary; determining, by the controller, a lane change possibility based on the recognized curvature of the front lane, the recognized curvature of the rear lane, and the position information and speed information of the other vehicle; and controlling, by the controller, at least one of steering, deceleration, and acceleration based on the determined lane change possibility.

The determining of the lane change possibility may include recognizing a lane in which the other vehicle is driving based on the recognized curvature of the front lane, the recognized curvature of the rear lane, and the position information of the other vehicle; determining whether the recognized lane of the other vehicle is the same as a lane to be changed; in response to determining that the recognized lane of the other vehicle is the same as the lane to be changed, determining a possibility of collision; in response to determining that the possibility of collision exists, determining that the lane change is impossible; and in response to determining that there is no the possibility of collision, determining that the lane change is possible.

The method may further include, in response to determining that the lane change is possible, obtaining, by the controller, a target steering angle based on a target yaw rate obtained in advance and a yaw rate detected by a yaw rate detector; and controlling, by the controller, the steering based on the obtained target steering angle.

The determining of the lane change possibility may include, in response to determining that the other vehicle is driving in another lane in the rear, obtaining the speed information of the other vehicle; obtaining a distance to the other vehicle based on the obtained speed information and position information; obtaining a lane changeable distance based on a moving distance by reaction time, a moving distance by deceleration, and a safety distance; and in response to the obtained distance exceeding the lane changeable distance, determining that the lane change is possible.

The method may further include, in response to receiving a lane change command through an input, determining, by the controller, a lane change possibility based on the recognized curvature of the front lane, the recognized curvature of the rear lane, and the position information and speed information of the other vehicle; and outputting, by the controller, information about the lane change possibility through at least one of display and sound output.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
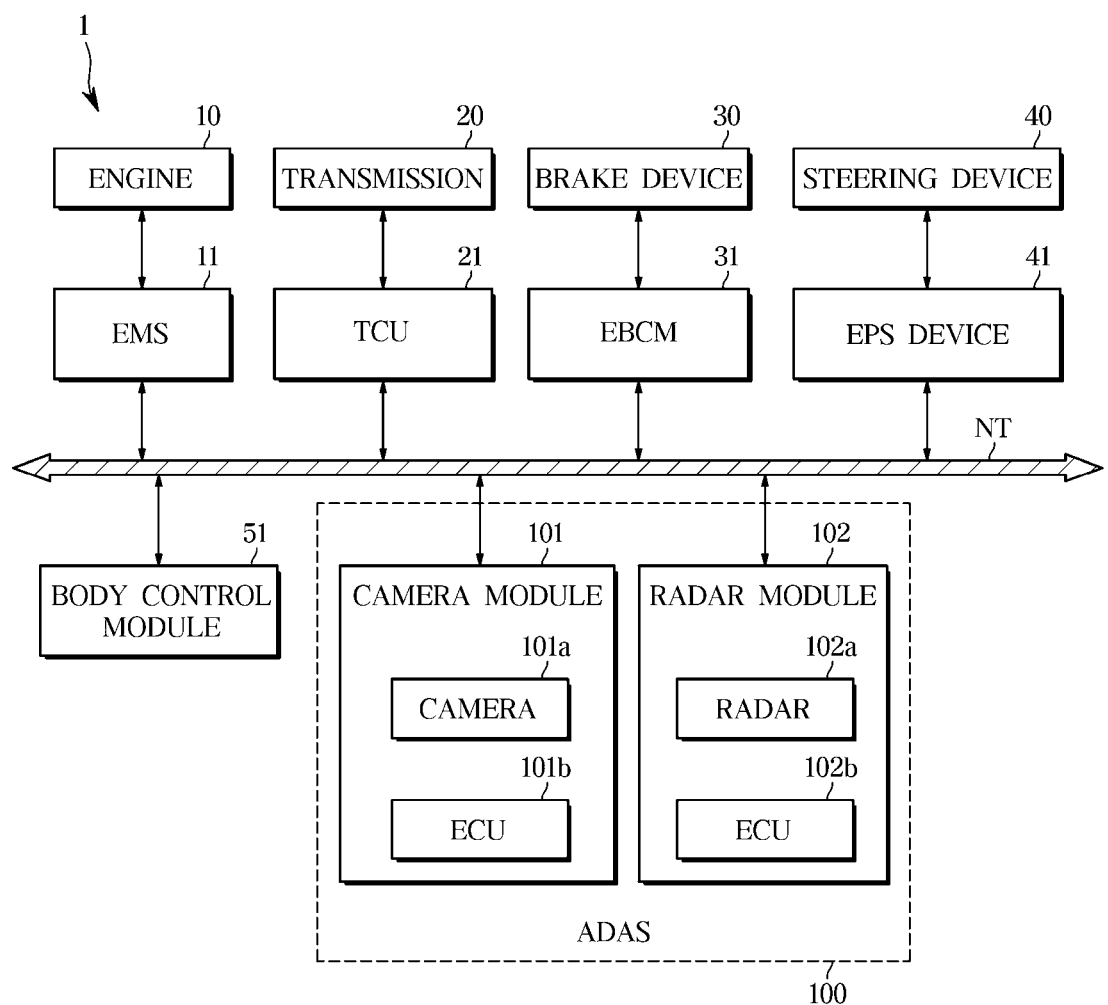
FIG. 1 is a block diagram illustrating a vehicle according to an embodiment.

Like reference numerals refer to like elements throughout the specification. Not all elements of the embodiments of the disclosure will be described, and the description of what are commonly known in the art or what overlap each other in the exemplary embodiments will be omitted.

The terms as used throughout the specification, such as "~part," "~module," "~member," "~block," etc., may be implemented in software and/or hardware, and a plurality of "~parts," "~modules," "~members," or "~blocks" may be implemented in a single element, or a single "~part," "~module," "~member," or "~block" may include a plurality of elements.

It will be further understood that the term "connect" and its derivatives refer both to direct and indirect connection, and the indirect connection includes a connection over a wireless communication network.

The terms "include (or including)" and "comprise (or comprising)" are inclusive or open-ended and do not exclude additional, unrecited elements or method steps, unless otherwise mentioned. It will be further understood that the term "member" and its derivatives refer both to when a member is in contact with another member and when another member exists between the two members.

Throughout the specification, when a member is located "on" another member, this includes not only when one member is in contact with another member but also when another member exists between the two members.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section.

It is to be understood that the singular forms "a," "an," and "the" include plural references unless the context clearly dictates otherwise.

Reference numerals used for method steps are merely used for convenience of explanation, but not to limit an order of the steps. Thus, unless the context clearly dictates otherwise, the written order may be practiced otherwise.

Hereinafter, operation principles and embodiments of the disclosure will be described with reference to accompanying drawings.

FIG. 1 is a block diagram illustrating a vehicle according to an embodiment.

A vehicle according to the embodiment may be a vehicle that performs a manual driving mode for driving in response to a driver's driving intent and an autonomous driving mode for autonomously driving to a destination.

When driving in the manual driving mode, information about a lane change possibility is output, or when driving in the autonomous driving mode, it may be a vehicle having a lane change assistance device that controls lane change based on the lane change possibility.

Referring to FIG. 1, a vehicle 1 may include an engine 10, a transmission 20, a braking device 30, and a steering device 40.

The engine 10 may include a cylinder and a piston, and may generate power for the vehicle 1 to drive.

The transmission 20 may include a plurality of gears, and may transmit power generated by the engine 10 to wheels.

The braking device 30 may decelerate or stop the vehicle 1 through friction with the wheels.

The steering device 40 may change a driving direction of the vehicle 1.

The vehicle 1 may include a plurality of electrical components.

For example, the vehicle 1 further includes an engine management system (EMS) 11, a transmission control unit (TCU) 21, and an electronic brake control module (EBCM) 31), an electronic power steering (EPS) 41, a body control module (BCM), and an advanced driver assistance system (ADAS).

The EMS 11 may control the engine 10 in response to acceleration intent of the driver through an accelerator pedal or a request of an advanced driver assistance system (ADAS) 100. For example, the EMS 11 may control torque of the engine 10.

The TCU 21 may control the transmission 20 in response to a shift command of the driver through a shift lever and/or a travelling velocity of the vehicle 1. For example, the TCU 21 may adjust the gear ratio from the engine 10 to the vehicle wheels.

The EBCM 31 may control the braking device 30 in response to a braking intent of a driver through a braking pedal and/or a slip of the vehicle wheels. For example, the EBCM 31 may temporarily release the braking of the vehicle wheel in response to a slip of the vehicle wheel sensed at a time of braking of the vehicle 1 (anti-lock braking systems, ABS).

The EBCM 31 may selectively release braking of the vehicle wheel in response to over-steering and/or under-steering sensed at a time of steering of the vehicle 1 (electronic stability control, ESC).

In addition, the EBCM 31 may temporarily brake the vehicle wheels in response to a slip of the vehicle wheel sensed at a time of driving of the vehicle 1 (traction control system, TCS).

The EPS 41 may assist the operation of the steering device 40 so that the driver easily manipulates a steering wheel, in response to a steering intent of the driver through the steering wheel. For example, the EPS 41 may assist the operation of the steering device 40 such that the steering force is reduced during low-velocity traveling or parking and is increased during high-velocity traveling.

The BCM 51 may control the operation of the electronic components that provide convenience to the driver or ensure the safety of the driver. For example, the BCM 51 may control a head lamp, a wiper, a cluster, a multifunction switch, a turn signal lamp, and the like.

The ADAS 100 may assist the driver in manipulating (driving, braking, steering) the vehicle 1. For example, the ADAS 100 may detect a surrounding environment (e.g., another vehicle, a pedestrian, a cyclist, a lane, a road sign, etc.) around the vehicle 1 and control the driving and/or braking and/or steering of the vehicle 1 in response to the sensed surrounding environment.

The ADAS 100 may provide the driver with various functions. For example, the DAS 60 may provide a lane departure warning (LDW), a lane keeping assist (LKA), a high beam assist (HBA), an autonomous emergency braking (AEB), a traffic sign recognition (TSR), a smart cruise control (SCC), a blind spot detection (BSD), and the like.

The ADAS 100 may include a collision avoidance device that outputs notification information about a collision with an obstacle or avoids the obstacle to prevent the collision with the obstacle.

The ADAS 100 may recognizes the road environment by itself, determines obstacles and driving conditions, and controls the vehicle's driving according to the planned driving route based on the position information while avoiding obstacles to autonomously drive to the destination. It may include control functions.

The ADAS 100 may include an autonomous driving control function that allows the vehicle to recognize a road environment by itself, determine the obstacle and a driving situation, and control the driving of the vehicle according to a planned driving path based on the position information while avoiding an obstacle such that the vehicle automatically drives to the destination.

The ADAS 100 may include the lane change assistance device that outputs information about the lane change possibility or controls at least one of lane change, acceleration, and deceleration based on the lane change possibility.

The ADAS 100 may include a camera module 101 for obtaining image data around the vehicle 1 and a radar module 102 for obtaining obstacle data around the vehicle 1.

The camera module 101 may include a camera 101a and an electronic control unit (ECU) 101b, and may photograph the front of the vehicle 1 and recognize other vehicles, pedestrians, cyclists, lanes, road signs, and the like.

The radar module 102 may include a radio detecting and ranging (radar) 102a and an electronic control unit (ECU) 102b, and may obtain relative positions and relative velocities of obstacles (e.g., other vehicles, pedestrians, cyclists, and the like) around the vehicle 1.

The above described electronic components may communicate with each other through vehicle communication network (NT). For example, the electrical components may exchange data therebetween through Ethernet, media oriented systems transport (MOST), Flexray, controller area network (CAN), local interconnect network (LIN), and the like. Here, the data may include vehicle driving data related to vehicle driving information.

The ADAS 100 may transmit a driving control signal, a braking signal, and a steering signal to the EMS 11, the EBCM 31, and the EPS 41, respectively, through the NT.

Figure 2:
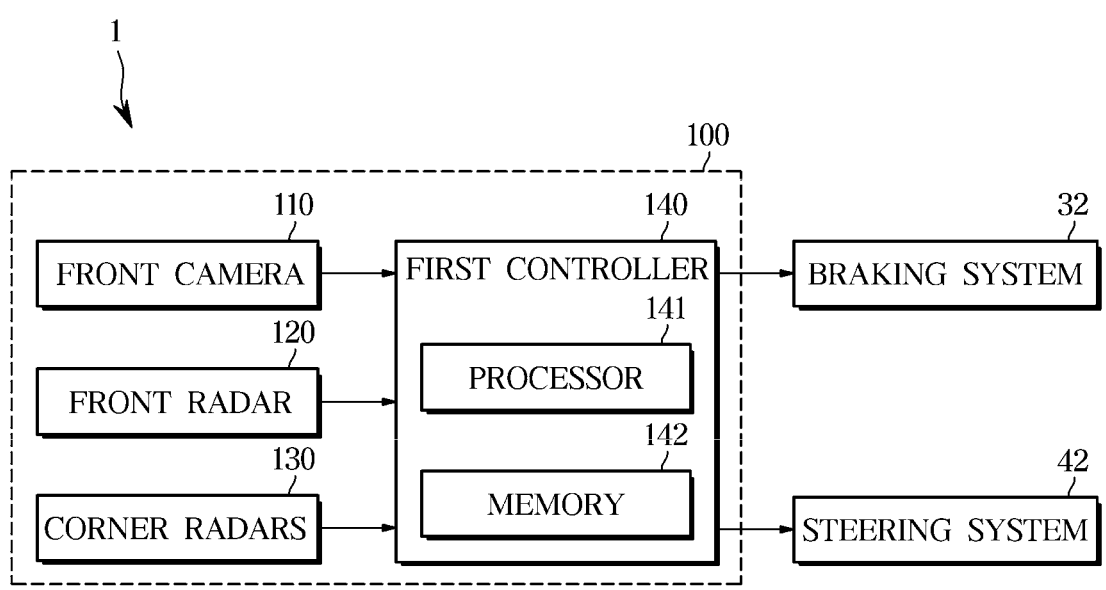
FIG. 2 is a block diagram illustrating an advanced driver assistance system (ADAS) provided in a vehicle according to an embodiment.
Figure 3:
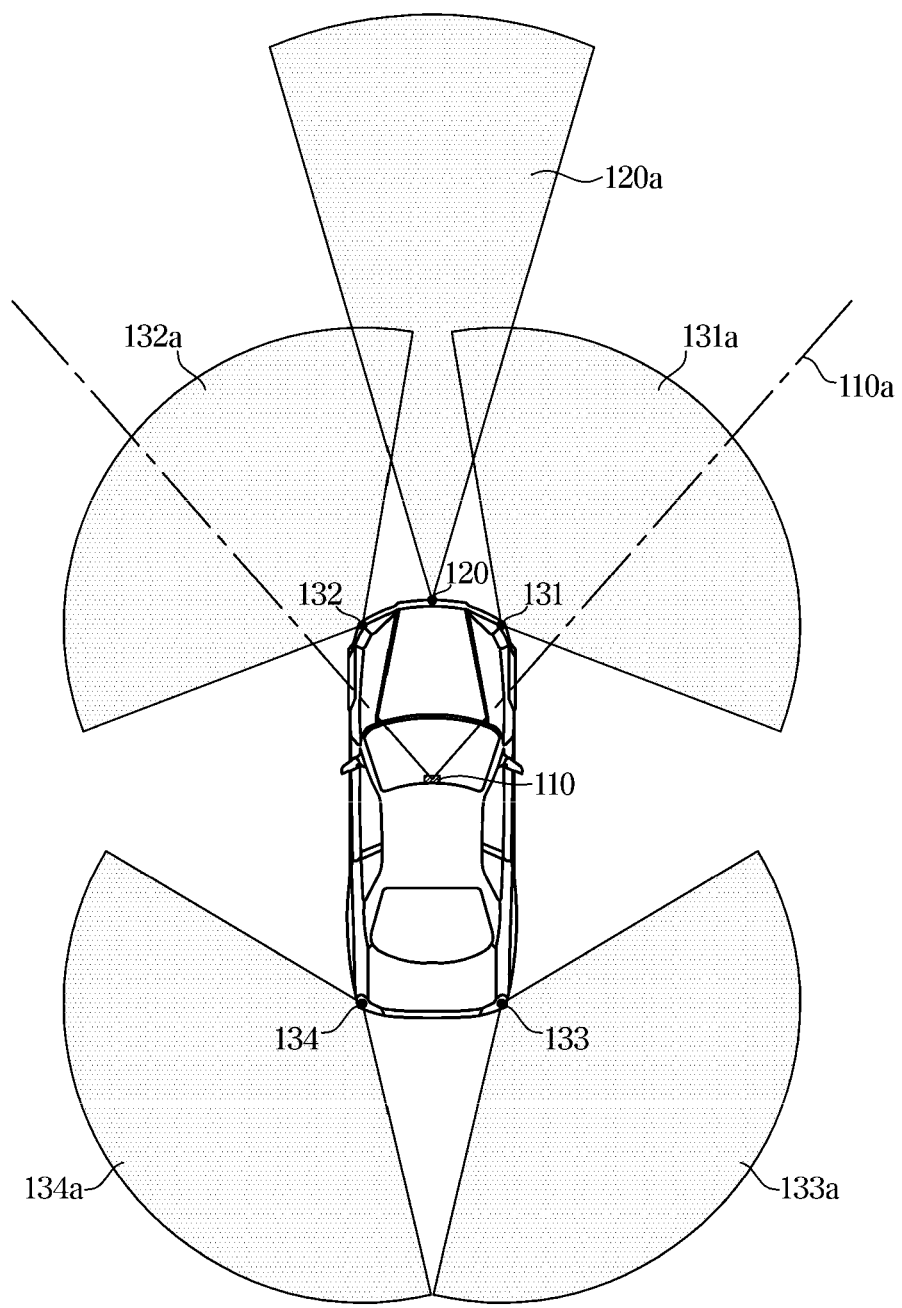
FIG. 3 is a view illustrating an example of a detection area of a camera and a radar included in an ADAS of a vehicle according to an embodiment.

FIG. 2 is a block diagram illustrating an ADAS provided in a vehicle according to an embodiment, and FIG. 3 is a view illustrating an example of a detection area of a camera and a radar included in an ADAS of a vehicle according to an embodiment.

The ADAS according to the embodiment may perform a collision avoidance function for preventing the collision with the obstacle when changing the lane. That is, the ADAS according to the embodiment may represent the collision avoidance device.

The ADAS of the embodiment may be the lane change assistance device that outputs information about the lane change possibility or controls the lane change based on the lane change possibility.

Referring to FIG. 2, the vehicle 1 may include a braking system 32, a steering system 42, and the ADAS 100.

The braking system 32 according to the embodiment may include the EBCM 31 (see FIG. 1) and the braking device 30 (see FIG. 1) described in conjunction with FIG. 1, and the steering system 42 may include the EPS 41 (see FIG. 1) and the steering device 40 (see FIG. 1).

The ADAS 100 according to the embodiment may include a front camera 110 as a camera of the camera module 101, and may include a plurality of corner radars 130 (131, 132, 133, and 134) as the radar of the radar module 102.

Referring to FIG. 3, the ADAS 100 may include the front camera 110 configured to have a field of view 110a directed to the front of the vehicle 1, a front radar 120, and the plurality of corner radars 130.

The front camera 110 may be installed on a front windshield of the vehicle 1.

The front camera 110 may image the front of the vehicle 1 and acquire image data regarding the front of the vehicle 1. The image data regarding the front of the vehicle 1 may include position information of at least one of another vehicle, a pedestrian, a cyclist, a lane, a curb, a guard rail, a roadside tree, a street lamp, or the like existing in front of the vehicle 1.

The front camera 110 may include a plurality of lenses and an image sensor. The image sensor may include a plurality of photodiodes for converting light into electrical signals, and the plurality of photodiodes may be arranged in a two-dimensional matrix.

The front camera 110 may be electrically connected to a first controller 140. For example, the front camera 110 may be connected to the first controller 140 through a vehicle communication network NT, through a hard wire, or through a printed circuit board (PCB).

The front camera 110 may transmit the image data of the front of the vehicle 1 to the first controller 140.

The front radar 120 may have a field of sensing 120a directed to the front of the vehicle 1. The front radar 120 may be installed, for example, on a grille or a bumper of the vehicle 1.

The front radar 120 may include a transmission antenna (or a transmission antenna array) that radiates transmission radio waves to the front of the vehicle 1 and a reception antenna (or a reception antenna array) that receives reflection radio waves reflected from an obstacle.

The front radar 120 may acquire front radar data from the transmission radio waves transmitted by the transmission antenna and the reflection radio waves received by the reception antenna.

Front radar data may include position information and velocity information regarding an obstacle, such as another vehicle, a pedestrian, or a cyclist existing in front of the vehicle 1.

The front radar 120 may calculate the relative distance to the obstacle based on the phase difference (or time difference) between the transmission radio waves and the reflection radio waves, and calculate the relative velocity of the object based on the frequency difference between the transmission radio waves and the reflected radio waves.

The front radar 120 may be connected to the first controller 140 through a vehicle communication network NT, a hard wire, or a printed circuit board. The front radar 120 may transmit the front radar data to the first controller 140.

The plurality of corner radars 130 includes a first corner radar 131 installed on the front right side of the vehicle 1, a second corner radar 132 installed on the front left side of the vehicle 1, a third corner radar 133 installed on the rear right side of the vehicle 1, and a fourth corner radar 134 installed on the rear left side of the vehicle 1.

The first corner radar 131 may have a field of sensing 131a directed to the front right side of the vehicle 1. The first corner radar 131 may be installed on the right side of a front bumper of the vehicle 1.

The second corner radar 132 may have a field of sensing 132a directed to the front left side of the vehicle 1, and may be installed on the left side of the front bumper of the vehicle 1.

The third corner radar 133 may have a field of sensing 133a directed to the rear right side of the vehicle 1 and may be installed on the right side of a rear bumper of the vehicle 1.

The fourth corner radar 134 may have a field of sensing 134a directed to the rear left side of the vehicle 1 and may be installed on the left side of the rear bumper of the vehicle 1.

Each of the first, second, third and fourth corner radars 131, 132, 133, and 134 may include a transmission antenna and a reception antenna.

The first, second, third, and fourth corner radars 131, 132, 133 and 134 acquire first corner radar data, second corner radar data, third corner radar data, and fourth corner radar data, respectively.

The first corner radar data may include distance information and velocity information regarding another vehicle, a pedestrian or a cyclist (hereinafter, referred to as the obstacle) existing on the front right side of the vehicle 1.

The second corner radar data may include distance information and velocity information regarding an obstacle existing on the front left side of the vehicle 1.

The third and fourth corner radar data may respectively include distance and velocity information regarding an obstacle existing on the rear right side of the vehicle 1 and distance and velocity information regarding an object located on the rear left side of the vehicle 1, respectively.

Each of the first, second, third, and fourth corner radars 131, 132, 133 and 134 may be connected to the first controller 140, for example, through the vehicle communication network NT, a hard wire, or a printed circuit board. The first, second, third, and fourth corner radars 131, 132, 133, and 134 may respectively transmit the first corner radar data, the second corner radar data, the third corner radar data, and the fourth corner radar data to the first controller 140.

The first controller 140 may include the ECU 101b (see FIG. 1) of the camera module 101 (see FIG. 1) and/or the ECU 102b (see FIG. 1) of the radar module 102 (see FIG. 1), and/or an integrated ECU.

The first controller 140 includes a processor 141 and a memory 142.

The processor 141 may process the front image data of the front camera 110, the front radar data of the front radar 120, and the corner radar data of the plurality of corner radars 130, and generate a braking signal and a steering signal for controlling the braking system 32 and the steering system 42.

For example, the processor 141 may include an image signal processor for processing the front image data of the front camera 110 and/or a digital signal processor for processing radar data of the radars 120 and 130 and/or a micro control unit (MCU) for generating a braking signal and/or a steering signal.

The processor 141 may detect obstacles (e.g., another vehicle, a pedestrian, a cyclist, a curb, a guard rail, a roadside tree, a street lamp, and the like) in front of the vehicle 1 based on the front image data of the front camera 110 and the front radar data of the radar 120.

In detail, the processor 141 may acquire position information (distance and direction) and velocity information (relative velocity) of the obstacles in front of the vehicle 1 based on the front radar data of the front radar 120. The processor 141 may acquire position information (direction) and type information (for example, whether the obstacle is another vehicle, a pedestrian, a cyclist, a curb, a guard rail, a roadside tree, a street lamp, or the like) of the obstacle existing in front of the vehicle 1 based on the front image data of the front camera 110.

In addition, the processor 141 may match the obstacles detected by the front image data with the obstacles detected by the front radar data, and acquire the type information, the position information, and the velocity information of the obstacles in front of the vehicle 1 based on a result of the matching.

The processor 141 may generate a braking signal and a steering signal based on the type information, the position information, and the velocity information of the front obstacles.

For example, the processor 141 calculates a time to collision (TTC) between the vehicle 1 and the front obstacle based on the position information (relative distance) and the velocity information (relative velocity) of the front objects, and warns the driver of a collision, transmits a braking signal to the braking system 32, or transmits a steering signal to the steering system 42 based on a result of comparing the TTC with a predetermined reference time.

In response to the TTC less than a predetermined first reference time, the processor 141 may allow an alert to be output via audio and/or display.

In response to the TTC less than a predetermined second reference time, the processor 141 may transmit a preliminary-braking signal to the braking system 32.

In response to the TTC less than a predetermined third reference time, the processor 141 may transmit an emergency braking signal to the braking system 32. In this case, the second reference time is shorter than the first reference time, and the third reference time is shorter than the second reference time.

The processor 141 may transmit a steering signal to the steering system 42 based on the direction information of the position information of the front obstacles.

As another example, the processor 141 may calculate a distance to collision (DTC) based on the velocity information (e.g., relative velocity) of front objects, and warn the driver of a collision or transmit a braking signal to the braking system 32 based on a result of comparing the DTC with distances to the front objects.

The processor 141 may acquire position information (distance and direction) and velocity information (relative velocity) of the obstacles on the sides of the vehicle 1 (front right, front left, rear right, and rear left) based on corner radar data of the plurality of corner radars 130.

The memory 142 may store programs and/or data for processing image data by the processor 141, programs and/or data for processing radar data by the processor 141, and programs and/or data for generating a braking signal and/or a steering signal by the processor 141.

The memory 142 may temporarily memorize the image data received from the front camera 110 and/or the radar data received from the radars 120 and 130, and may temporarily memorize a result of processing the image data and/or the radar data of the processor 141.

The memory 142 may not only include a volatile memory, such as an S-RAM, a D-RAM, and the like, but also include a non-volatile memory, such as a flash memory, a read only memory (ROM), an erasable programmable read only memory (EPROM), and the like.

Figure 4:
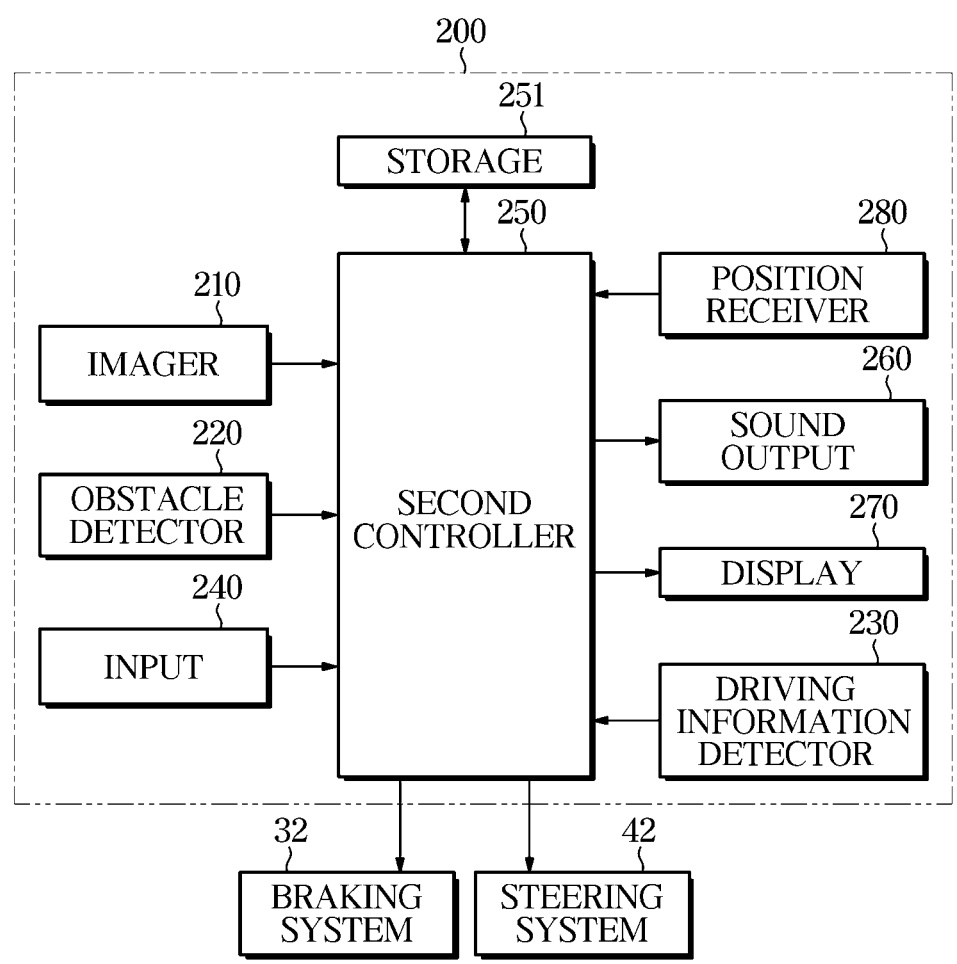
FIG. 4 is a control block diagram illustrating a lane change assistance device of an ADAS provided in a vehicle according to an embodiment.

FIG. 4 is a control block diagram illustrating a lane change assistance device of an ADAS provided in a vehicle according to an embodiment.

A lane change assistance device 200 of the ADAS 100 may include an imager 210, an obstacle detector 220, a driving information detector 230, an input 240, a second controller 250, a storage 251, a sound output 260, and a display 270, and may further include the braking system 32 and the steering system 42.

The imager 210 may obtain an image of a road and transmit information of the obtained image to the second controller 250. Here, the image information may be image data.

The imager 210 may include the front camera 110, obtain the image information of the road from front image data captured by the front camera 110, and obtain a shape of the obstacle.

Here, the image information of the road may include a lane image.

In addition, the shape of the obstacle may be information for recognizing a type of the obstacle. In addition, it is also possible to obtain position information and speed information of the obstacle from the image data captured by the front camera 110.

The imager 210 may include a rear camera, obtain the image information of the road from rear image data captured by the rear camera, and obtain the shape of the obstacle. Here, the image information of the road may include the lane image.

The obstacle detector 220 may detect obstacles in the front and left and right sides of a subject vehicle, and transmit obstacle information about the detected obstacle to the second controller 250. Here, the obstacle information may include position information of the obstacle, and the position information of the obstacle may include a distance to the obstacle and a direction of the obstacle.

The obstacle detector 220 may include the front radar 120 and first and second corner radars 131 and 132.

In addition, the obstacle detector 220 may include a Light Detection And Ranging (LiDAR) sensor. The LiDAR sensor is a non-contact distance detection sensor using a principle of laser radar. The LiDAR sensor may include a transmitter that transmits a laser, and a receiver that receives the laser that returns after being reflected on a surface of an object existing within a sensor range.

Here, the laser may be a single laser pulse.

For reference, since the LiDAR sensor has higher detection accuracy in a transverse direction than a radar sensor, it is possible to increase the accuracy of a process of determining whether a passage exists in the front.

The obstacle detector 220 may include an ultrasonic sensor.

The ultrasonic sensor may generate ultrasonic waves for a certain time and then detect a signal that is reflected on the object and returned. The ultrasonic sensor may be used to determine the presence or absence of the obstacle such as the pedestrian within a short range.

The driving information detector 230 may detect driving information of the vehicle 1 such as driving speed information, driving direction information, and yaw rate information. Here, the driving information of the vehicle 1 may be movement information of the vehicle 1.

The driving information detector 230 may include at least one of a speed detector, a steering angle detector, and a yaw rate detector.

The speed detector may include a plurality of wheel speed sensors. The speed detector may include an acceleration sensor. The speed detector may include a plurality of wheel speed sensors and acceleration sensors.

When the speed detector is the acceleration sensor, the second controller 250 may obtain the acceleration of the subject vehicle based on the information detected by the acceleration sensor, and obtain the driving speed of the subject vehicle based on the obtained acceleration.

When the speed detector is the acceleration sensor and the plurality of wheel speed sensors, the second controller 250 may obtain the acceleration of the subject vehicle based on the information detected by the acceleration sensor, and obtain the driving speed of the subject vehicle based on the speed information obtained by the plurality of wheel speed sensors.

The input 240 may receive either the manual driving mode in which the driver directly drives the vehicle 1 or the autonomous driving mode in which the driver drives automatically, and may transmit the input signal to the second controller 250.

The input 240 may be provided in a head unit or a center fascia in the vehicle 1, or may be provided in a vehicle terminal.

In the autonomous driving mode, the input 240 may receive information of the destination, or the driving speed.

The input 240 may receive a selection of a collision avoidance notification mode indicating the possibility of collision with the obstacle.

The input 240 may receive a notification mode about the lane change possibility, that is, a lane change notification mode, from the user while the manual driving mode is being performed.

The input 240 may also receive information about requesting the lane change from the user while performing the autonomous driving mode. The input 240 may be a multi-function switch, that is, an operation lever provided around the steering wheel. The multi-function switch may be operated by the user when performing the autonomous driving mode, and may generate a lane change request signal at this time.

The generated lane change request signal may include a signal for changing to a right lane or a signal for changing to a left lane.

The second controller 250 may generate a path from a current position to the destination based on current position information and the destination information received by a position receiver 280 and control driving based on information about the generated path.

During the autonomous driving control, the second controller 250 may control a display of a road image or control the display 270 to display the position of the obstacle as a top view image.

The second controller 250 may control to drive at the driving speed set in advance when performing the autonomous driving mode, or control to drive at the driving speed input by the user.

The second controller 250 may periodically obtain the driving speed of the subject vehicle based on the speed information detected by the speed detector of the driving information detector 230 and control acceleration and deceleration so that the obtained driving speed is maintained at a preset driving speed.

When the image information of the road is received during the autonomous driving control, the second controller 250 may recognize the lane of the road by performing image processing, and recognize a subject lane in which the subject vehicle is driving based on the position information of the recognized lane, and control the autonomous driving based on the position of both lanes in the subject lane.

The second controller 250 may recognize a front lane from the image of the front camera 110 and may recognize a rear lane from the image of the rear camera.

The second controller 250 may recognize a curvature of the front lane based on the recognized information about the front lane. The second controller 250 may recognize a curvature of the rear lane based on the recognized information about the rear lane.

The second controller 250 may recognize the curvature of the rear lane based on the driving information detected for a predetermined time. Here, the driving information may include at least one of the driving speed, the steering angle, and the yaw rate.

The driving information may be information corresponding to the driving state of the vehicle 1, and may be information for predicting a moving distance and a moving direction according to a change in moving time.

The second controller 250 may recognize the curvature of the front lane based on the driving information detected for the predetermined time.

The second controller 250 may also recognize the curvature of the front lane and the curvature of the rear lane based on path information, map information, and the current position information among the navigation information.

The second controller 250 may compare the recognized curvature of the front lane with the recognized curvature of the rear lane. When the recognized curvature of the front lane and the recognized curvature of the rear lane are the same, the second controller 250 may determine the lane change possibility based on the position information of the obstacle.

The second controller 250 may compare the recognized curvature of the front lane with the recognized curvature of the rear lane. When the recognized curvature of the front lane and the recognized curvature of rear lane are different, the second controller 250 may determine the lane change possibility based on the curvature of the rear lane and the position information of the obstacle.

The second controller 250 may obtain a curvature difference value between the recognized curvature of front lane and the recognized curvature of rear lane. When the obtained curvature difference value is more than a certain value, the second controller 250 may determine the lane change possibility based on the curvature of the rear lane and the position information of the obstacle.

The second controller 250 acquires a curvature difference value between the recognized curvature of the front lane and the recognized rear lane, and determines the lane change possibility based on the position information of the obstacle if the obtained curvature difference value is less than a certain value. It is also possible.

The second controller 250 may recognize the obstacle based on the obstacle information detected by the obstacle detection unit 220. The second controller 250 may warn the driver of the collision based on the obstacle information of the recognized obstacle, or may transmit a braking signal to the braking system 32 or a steering signal to the steering system 42.

Here, the obstacle information may include information about the presence of the obstacle and the position information of the obstacle, and the position information of the obstacle may include a distance value from the obstacle and a direction of the obstacle.

The distance to the obstacle may be a relative distance between the subject vehicle and the obstacle, and the direction of the obstacle may be a relative direction to the subject vehicle.

When the position information of the obstacle is received, the second controller 250 may obtain the speed information of the obstacle based on a change in the received position information of the obstacle.

That is, the second controller 250 may periodically receive the position information of the obstacle detected by the obstacle detector 220, periodically obtain the distance value to the obstacle from the received position information of the obstacle, obtain the change in the distance value corresponding to the change in time from a periodically obtained distance value to the distance, and obtain the speed information corresponding to a moving speed of the obstacle from the change in the obtained distance value.

The second controller 250 may obtain state information of the obstacle regarding whether the obstacle is in a stationary state or the driving state based on the obtained speed information of the obstacle, and may determine whether the state information of the obstacle is changed.

Here, the obstacle may be an obstacle that exists in front of the subject vehicle based on the front bumper of the subject vehicle, and may be an obstacle that exists behind the subject vehicle based on the rear bumper of the subject vehicle, and may be an obstacle driving in the left lane or the right lane of the subject vehicle.

For example, the obstacles may be pedestrians, bicycles, bikes, other vehicles, curbs or guardrails, street lights or street trees.

The second controller 250 may recognize the obstacle based on the image of the road, and obtain the state information of the obstacle as to whether the obstacle is in the stationary state or the driving state based on a change in size and position of the obstacle in the image.

When recognizing surrounding obstacles, the second controller 250 may recognize the obstacles in the front, rear, left and right of the subject vehicle of the subject vehicle among the obstacles on the road.

When changing and controlling the lane to a first lane of a first vehicle (that is, the subject vehicle 1), the second controller 250 may determine whether there is a second vehicle in front driving on the first lane. When it is determined that the second vehicle is present, the second controller 250 may calculate a time to collision (TTC) between the vehicle 1 and the second vehicle based on the position information (relative distance) and the speed information (relative speed) of the second vehicle. When it is determined that the TTC is more than a predetermined reference time, the second controller 250 may control the lane change. When it is determined that the TTC is less than the predetermined reference time, the second controller 250 may not perform the lane change to the first lane and control the driving based on the position information of a current lane.

Here, the predetermined reference time may be approximately 3 seconds.

The first lane may be the left lane or the right lane.

The second vehicle in front driving on the first lane may be another vehicle driving in a lane different from the vehicle 1 among other vehicles driving at a position spaced apart from the front bumper of the vehicle 1 by a set distance or more.

The second controller 250 may determine whether a third vehicle driving in a position adjacent to the first vehicle 1 exists when changing and controlling the lane to the first lane of the first vehicle. When it is determined that the third vehicle is present in the first lane, the second controller 250 may calculate a distance to collision (DTC) based on the speed information (i.e., relative speed) of the third vehicle. When it is determined that the DTC is more than a predetermined distance, the second controller 250 may control the lane change. When it is determined that the DTC is less than the predetermined reference distance, second controller 250 may not perform the lane change and control the driving based on the position information of the current lane.

The third vehicle driving in the position adjacent to the subject vehicle may be another vehicle driving in the lane different from the vehicle 1 among other vehicles driving at the position spaced apart from the front bumper of the vehicle 1 by less than the set distance.

The third vehicle driving in the position adjacent to the subject vehicle may be another vehicle driving in the lane different from the vehicle 1 among other vehicles driving at the position spaced apart from the rear bumper of the vehicle 1 by less than the set distance.

When changing and controlling the lane to the first lane of the first vehicle, the second controller 250 may determine whether a fourth vehicle driving in the position adjacent to the subject vehicle 1 exists. When it is determined that the fourth vehicle exists, the second controller 250 may obtain a distance to the fourth vehicle based on the obstacle information detected by the obstacle detector 220. When it is determined that the obtained distance is greater than or equal to the reference distance, the second controller 250 may control the lane change. When it is determined that the obtained distance is less than the reference distance, the second controller 250 may control the driving based on the position information of the current lane.

When changing and controlling the lane to the first lane, the second controller 250 may determines whether the fourth vehicle exists. When it is determined that the fourth vehicle exists, the second controller 250 may obtain a lane changeable distance S and obtain a distance to the fourth vehicle based on the obstacle information. When the obtained distance to the fourth vehicle exceeds the obtained lane changeable distance, the second controller 250 may control the lane change. When it is determined that the obtained distance to the fourth vehicle is less than or equal to the obtained lane changeable distance, the second controller 250 may control the driving based on the position information of the current lane.

The lane changeable distance S may be obtained by a moving distance A by a reaction time, a moving distance B by the deceleration, and a safety distance C.

lane changeable distance($S$)=$A+B+C$ $A$=(Vrear−Vacsf)*$Tb$, $B$=(Vrear−Vacsf)$^2$/(2*$a$), $C$=Vacsf*$Tg$ Vrear is the driving speed of another vehicle, Vacsf is the driving speed of the vehicle 1 during steering control, a deceleration ($a$) of another vehicle is approximately 3 ms$^2$, a time Tb at which the deceleration of another vehicle starts after the start of the lane change is 0.4 s, and a remaining gap Tg with the subject vehicle after deceleration of another vehicle may be 1 s.

The fourth vehicle in the rear driving the first lane may be another vehicle driving in a lane different from the vehicle 1 among other vehicles driving at a position spaced apart by the set distance or more with respect to the rear bumper of the vehicle 1.

The first lane may be the left lane or the right lane.

When changing and controlling the lane to the first lane, the second controller 250 may determine whether there is the fourth vehicle in the rear driving the first lane. When it is determined that the fourth vehicle exists, the second controller 250 may identify curvature information of the rear lane, match the identified curvature information with the position information of another vehicle, and determine whether the lane change is possible based on the matching result.

The second controller 250 may determine whether the fourth vehicle is driving in the left or right lane behind the vehicle 1 by matching the identified curvature information with the position information of the fourth vehicle.

The second controller 250 may determine whether there is the collision with another vehicle in a state in which a collision notification mode is selected, and control output of collision information regarding whether the collision with the obstacle.

The second controller 250 may control lighting of a lane change notification lamp corresponding to the first lane when a lane change signal to the first lane is received through the input 240 while the collision notification mode is selected, determine whether there is the collision with another vehicle driving in the first lane, and control an output of collision notification information about whether there is the collision with the obstacle. Here, the input 240 may be the operation lever provided around the steering wheel.

When the autonomous driving mode is selected, the second controller 250 may determine whether there is a collision with a vehicle in another lane and control acceleration or deceleration based on the collision with the obstacle.

When controlling the lane change while the autonomous driving mode is selected, the second controller 250 may determine whether there is the collision with another vehicle driving another lane to be changed, and accelerate or decelerate based on the collision with the another vehicle, and control the lane change while controlling steering based on the collision with another vehicle.

When controlling the lane change while the autonomous driving mode is selected, the second controller 250 may determine whether there is the collision with another vehicle driving another lane to be changed, and control a delay of the lane change based on whether there is the collision with another vehicle.

When controlling the lane change while the autonomous driving mode is selected, the second controller 250 may perform lane change control when it is determined that there is no the possibility of collision with another vehicle.

When controlling the lane change, the second controller 250 may generate a lane change path in a form of a cubic equation and control steering to drive along the generated lane change path.

The second controller 250 may generate a following line based on both lanes of the recognized lane and generate the lane change path based on the generated following line.

That is, the second controller 250 may obtain a target steering angle corresponding to the generated lane change path and control the steering based on the obtained target steering angle and the currently detected steering angle.

Figure 5:
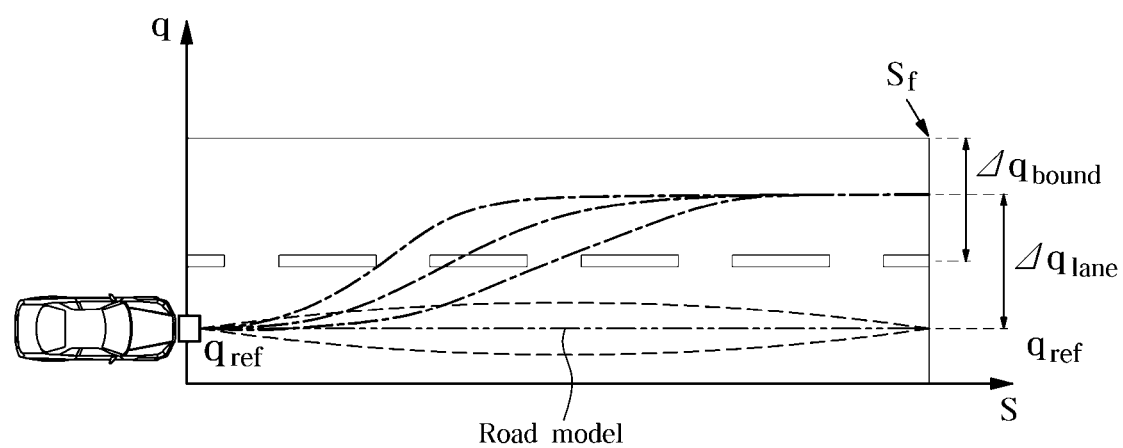
FIG. 5 is a view for obtaining a target steering angle in a vehicle according to an embodiment.

Target steering angle obtainment formula (see FIG. 5)

$$q_j(s) = \begin{cases} \alpha_j(s-s_i)^3 + \beta_j(s-s_i)^2 + \gamma_j(s-s_i) + q_{ref} &, s_i \le s < s_f \\ (j = 1, 2, 3, ..., m) & \\ q_{f_j} &, s_f \le s \end{cases}$$

$j : j_{th}$ Candidate, $i : i_{th}$ point of a candidate,

The second controller 250 may obtain a target driving speed and control acceleration or deceleration of the vehicle 1 based on the obtained target driving speed when it is determined that another vehicle exists in another lane to be changed and the possibility of collision with another vehicle exists.

The second controller 250 may obtain the target driving speed using a Hybrid A* algorithm.

The second controller 250 may obtain the target steering angle and the target driving speed based on a feed-forward value using a vehicle model and a feedback value using an error.

The second controller 250 may obtain the target steering angle based on a target yaw rate obtained in advance and the yaw rate detected by the yaw rate detector, and obtain a target steering angular velocity error based on the obtained target steering angle and the steering angle detected by the steering angle detector, obtain a target steering torque based on the obtained target steering angular velocity error, obtain a feed-forward steering torque by performing feed-forward control based on the obtained target steering torque, and control the steering based on the obtained feed-forward steering torque.

The second controller 250 may obtain a feed-forward steering angle based on the driving speed and the target yaw rate obtained in advance.

The second controller 250 may obtain a feedback steering torque based on the obtained target steering angular velocity error and control the steering based on the obtained feedback steering torque.

The second controller 250 may control the steering based on the obtained feed-forward steering torque and the obtained feedback steering torque.

In addition, the second controller 250 may drive the steering device 40 by the steering angle corresponding to the position information of the following line, or may drive the steering device 40 until the position of the following line to be adjusted based on the detection information of the steering angle detector is reached.

The second controller 250 may return the steering system 42 to an original position when the position of the following line for autonomous driving is completed.

The second controller 250 of the autonomous driving control device may communicate with the braking system 32 and the steering system 42.

The braking system 32 may perform braking in response to the braking signal of the second controller 250 to prevent collision with the obstacle.

The braking system 32 may perform emergency braking based on the braking signal of the second controller 250.

The steering system 42 may perform steering to adjust a movement path in response to a steering signal of the second controller 250.

The storage 251 may store information about the predetermined reference time and the predetermined reference distance for determining whether or not there is the collision with another vehicle.

The storage 251 may store driving information for the certain time, but may periodically store the driving information.

The storage 251 may also store the navigation information, the map information, and the path information.

The storage 251 may be implemented using at least one of a non-volatile memory element, e.g., a cache, a Read Only Memory (ROM), a Programmable ROM (PROM), an Erasable Programmable ROM (EPROM), an Electrically Erasable Programmable ROM (EEPROM) and a flash memory; a volatile memory element, e.g., a Random Access Memory (RAM); or a storage medium, e.g., a Hard Disk Drive (HDD) and a CD-ROM. The implementation of the storage is not limited thereto.

The storage 251 may be a memory that is implemented by a separate memory chip from the aforementioned processor related to the second controller 250 or the storage 251 may be implemented by a single chip with a processor.

The sound output 260 may output the sound in response to a control command of the second controller 250.

The sound output 260 may output a warning sound for notifying the presence of the obstacle invading at least one of the both lanes of the subject lane.

The sound output 260 may output a warning sound for preventing collision with the obstacle. The sound output 260 may be a speaker.

The display 270 may display the image, or may be turned on and off, in response to a control command of the second controller 250.

The display 270 displays the image of the road, road guidance information, and the map information.

The display 270 may display a top view image of the vehicle 1.

The display 270 may display information related to the collision avoidance notification mode.

The display 270 may display information related to a driving mode such as the autonomous driving mode or the manual driving mode.

The display 270 may be a lamp such as a light emitting diode (LED) or a flat panel display device such as a liquid crystal display (LCD).

The display 270 may be a display panel to be provided in a vehicle terminal.

The display 270 may display obstacles obtained by the imager 210 in addition to the lane.

The position receiver 280 may receive information for obtaining the current position of the vehicle 1.

The position receiver 280 may be a Global Positioning System (GPS) receiver that communicates with a plurality of satellites. Here, the GPS receiver may include an antenna module that receives signals from a plurality of GPS satellites, and may include software that obtains the current position using distance and time information corresponding to position signals of the plurality of GPS satellites and an output that outputs the obtained position data of the vehicle 1.

Figure 6:
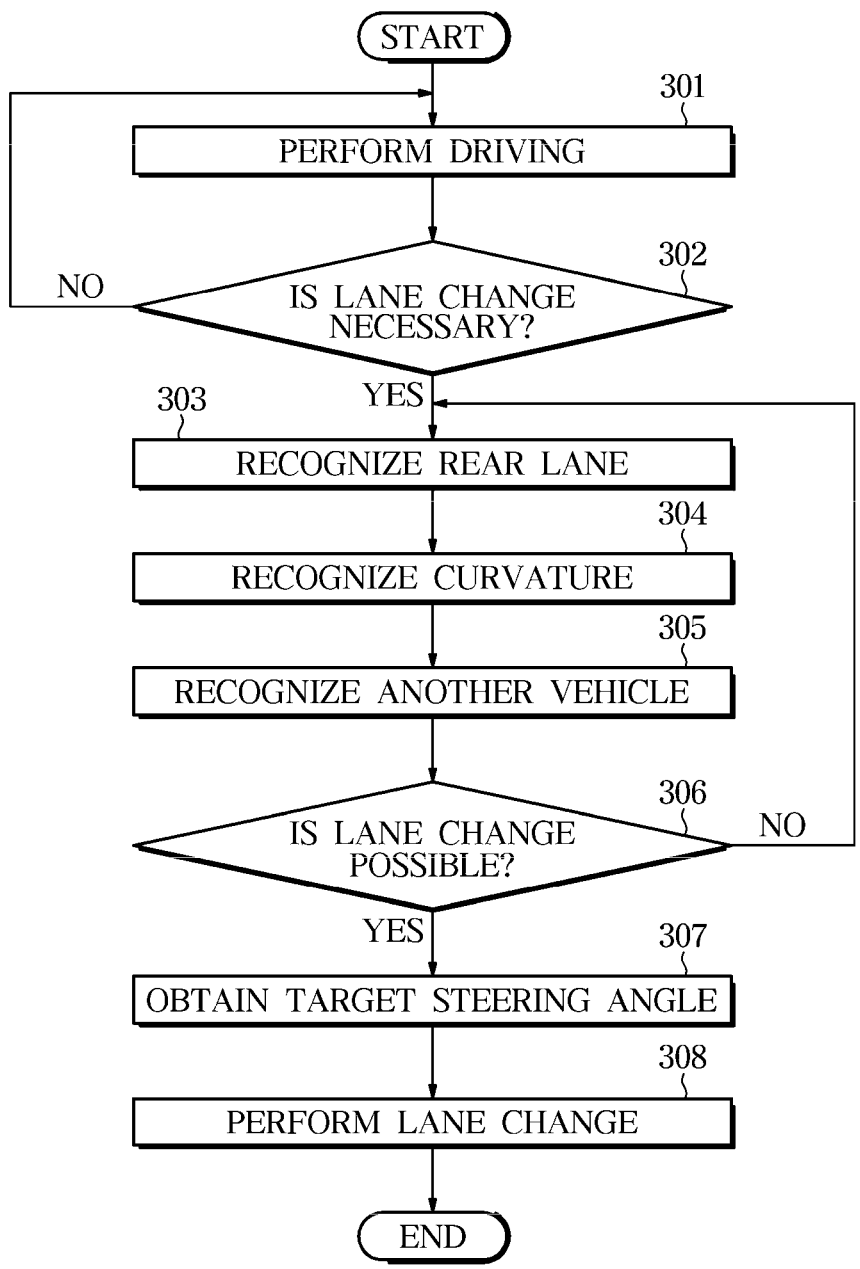
FIG. 6 is a flowchart illustrating a vehicle control according to an embodiment.

FIG. 6 is a view illustrating a control flowchart of a lane change device among an ADAS provided in a vehicle according to an embodiment, and will be described with reference to FIG. 7.

When the driving mode is the autonomous driving mode, the vehicle 1 may generate the path from the current position to the destination input by the user, and control the driving with the generated path.

During the autonomous driving, the vehicle 1 may obtain the image of the road by activating the imager 210, recognize the lane on a front road in the image by processing the obtained road image, recognize the subject lane based on the recognized position of the lane on the front, and autonomously drive while following the recognized subject lane (301). At this time, the vehicle 1 may generate the following line based on the position information of the both lanes constituting the subject lane and drive while following the generated following line.

In addition, the vehicle 1 may obtain the driving speed of the vehicle 1 based on the speed information detected by the speed detector, compare the obtained driving speed with the preset driving speed, and drive while controlling the braking and acceleration so that the obtained driving speed becomes the preset driving speed. Here, the preset driving speed may be a speed set by the user.

During image processing, the vehicle 1 may recognize the obstacle within the image and obtain the position information of the recognized obstacle based on the image.

Here, the obstacle is an obstacle that is located in front of the subject vehicle, but is located in another lane, and is an obstacle that exists in front of the subject vehicle based on the front bumper of the subject vehicle. For example, the obstacle may be at least one of pedestrians, bicycles, bikes, other vehicles, curbs, guardrails, street trees, and street lights.

The vehicle 1 may control the autonomous driving by recognizing the subject lane and the obstacles the subject vehicle is driving on.

When the vehicle 1 performs driving, it periodically stores the driving information of the vehicle 1, but may be accumulated and stored. Here, the driving information of the vehicle 1 may include the driving speed, the yaw rate, and the steering angle of the vehicle 1.

The vehicle 1 may recognize the front lane from the image obtained from the front camera 110 while driving, recognize the curvature of the front lane based on information about the recognized front lane, and store the recognized curvature of the front lane. In addition, the vehicle 1 may recognize the curvature of the front lane based on the generated path information, map information, and current position information among the navigation information.

The vehicle 1 may determine whether the lane change is necessary while driving along the path generated to the destination (302), and when it is determined that lane change is necessary, the vehicle 1 may identify the driving information of the vehicle 1 stored for a certain time and recognize a lane of a rear road of the vehicle 1 based on the identified driving information of the vehicle 1 (303), and recognize the curvature of the recognized lane of the rear road (304).

That is, the 1 vehicle may recognize the curvature of the road that has driven, that is, the rear road, based on the distance driven at the detected driving speed for the certain time and the change in the steering angle for the certain time.

When it is determined that the change lane is necessary, the vehicle 1 may identify the driving information of the vehicle 1 stored for the certain time and recognize the curvature of the rear lane based on the identified driving information of the vehicle 1.

Here, the curvature of the front lane may correspond to the curvature of the front subject lane, and the curvature of the rear lane may correspond to the curvature of the rear subject lane.

The vehicle 1 may recognize another vehicle driving in a surrounding lane based on the image of the road and the obstacle information of the obstacle detector 220 (305). Here, the surrounding lane may be the left lane of the subject lane or the right lane of the subject lane.

The vehicle 1 may obtain the position information of another vehicle detected based on the detection information detected by the obstacle detector 220, and determine whether another vehicle exists on the left or right of the subject vehicle based on the obtained position information of another vehicle.

Determining whether another vehicle is on the left side of the subject vehicle may include determining whether there is another vehicle driving in another lane on the left side of the subject lane.

Determining whether another vehicle is on the right side of the subject vehicle includes determining whether there is another vehicle driving in another lane on the right side of the subject lane.

When it is determined that another vehicle exists around the vehicle 1, the vehicle 1 may obtain the position information (distance and direction) and the speed information (relative speed) the obstacles of the vehicle 1 based on the front radar data of the front radar 120 of the obstacle detector 220.

In addition, the vehicle 1 may obtain the position information (distance and direction) and the speed information (relative speed) the obstacles on sides (front right, front left, left, right, rear right, rear left) of the vehicle 1 based on the corner radar data of the plurality of corner radars 130.

The vehicle 1 may obtain the position information (distance and direction) and the speed information (relative speed) the obstacles around the vehicle 1 based on at least one of the front image data of the front camera 110, the corner radar data of the plurality of corner radars 130, and the front radar data of the front radar 120.

The vehicle 1 may determine whether the lane change is possible based on the curvature of the rear lane, the curvature of the front lane, and the recognized position information and speed information of another vehicle (306). Determining whether the lane change is possible may include determining whether there is the possibility of the collision with another vehicle driving the lane to be changed.

Figure 7:
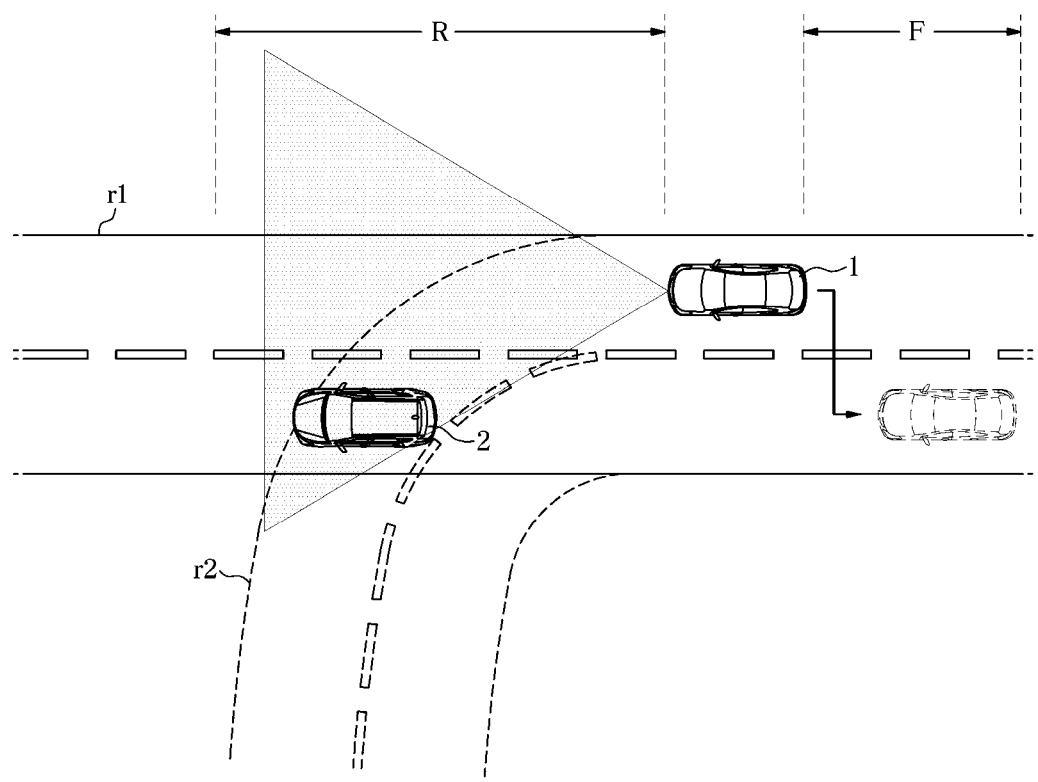
FIG. 7 is a view illustrating position recognition of another vehicle by a vehicle according to an embodiment.

Referring to FIG. 7, the vehicle 1 may compare the recognized curvature of the front lane F and the recognized rear lane R, and when the recognized curvature of the front lane and the recognized rear lane is different, the vehicle 1 may determine whether another vehicle is driving in the same lane as the subject vehicle or is driving in another lane based on the curvature of the rear lane and the position information of another vehicle.

For example, when the recognized curvature of the front lane F and the recognized rear lane R are the same, or a difference between the recognized curvature of the front lane F and the recognized rear lane R is less than a certain value, the driving lane of another vehicle 2 driving in a direction deviated from the subject vehicle 1 by a certain angle or more may be different from the driving lane of the subject vehicle 1.

Here, the recognized curvature of the front lane F and the recognized rear lane R are the same, or the difference between the recognized curvature of the front lane F and the recognized rear lane R is less than the certain value may refer to that the road on which the vehicle 1 is driving is a straight road r1.

However, when the recognized curvature of the front lane F and the recognized rear lane R are different, or the difference between the recognized curvature of the front lane F and the recognized rear lane R is more than the certain value, the driving lane of another vehicle 2 driving in the direction deviated from the subject vehicle 1 by the certain angle or more may be the same as the driving lane of the subject vehicle 1.

Here, the recognized curvature of the front lane F and the recognized rear lane R are different, or the difference between the recognized curvature of the front lane F and the recognized rear lane R is more than the certain value may refer to that the road on which the vehicle 1 is driving is a curved road r2.

That is, when the recognized curvature of the front lane F and the recognized rear lane R are different, the vehicle 1 may determine whether another vehicle is driving in the same lane as the subject vehicle or is driving in another lane based on the curvature of the rear lane and the position information of another vehicle.

In addition, when the recognized curvature of the front lane F and the recognized rear lane R are the same, the vehicle 1 may determine whether another vehicle is driving in the same lane as the subject vehicle or is driving in another lane based on the position information of another vehicle.

Based on the curvature of the rear lane, the curvature of the front lane, and the recognized position information of another vehicle, the vehicle 1 may determine whether there is another vehicle driving the lane to be changed. When it is determined that there is another vehicle driving the lane to be changed, the vehicle 1 may determine whether there is the possibility of the collision with another vehicle driving the lane to be changed.

The configuration for determining the possibility of collision with other vehicles will be described in more detail.

When changing and controlling the lane to the first lane, the vehicle (i.e., the first vehicle 1) may determine whether there is the second vehicle in front driving on the first lane. When it is determined that the second vehicle is present, the vehicle 1 may calculate the TTC between the vehicle 1 and the second vehicle based on the position information (relative distance) and the speed information (relative speed) of the second vehicle. When it is determined that the TTC is greater than or equal to the predetermined reference time, the vehicle 1 may determine that there is no the possibility of collision. When it is determined that the TTC is less than the predetermined reference time, the vehicle 1 may determine that there is the possibility of collision.

When the vehicle (that is, the first vehicle 1) changes and controls the lane to the first lane of the subject lane, the vehicle 1 may determine whether the third vehicle driving in the position adjacent to the first vehicle 1 exists. When it is determined that the third vehicle is present in the first lane, the vehicle 1 may calculate the DTC based on the speed information (i.e., relative speed) of the third vehicle. When it is determined that the distance of the DTC is more than the predetermined distance, the vehicle 1 may determine that there is no the possibility of collision. When it is determined that the DTC is less than the predetermined reference distance, the vehicle 1 may determine that there is the possibility of collision.

When the vehicle (that is, the first vehicle 1) changes and controls the lane to the first lane of the subject lane, the vehicle 1 may determine whether the fourth vehicle exists. When it is determined that the fourth vehicle exists, the vehicle 1 may obtain the lane changeable distance, and obtain a distance to the fourth vehicle based on the obstacle information. When the distance to the fourth vehicle exceeds the obtained lane changeable distance, the vehicle 1 may determine that there is no the possibility of collision. When it is determined that the obtained distance with the fourth vehicle is less than the obtained lane changeable distance, the vehicle 1 may determine that there is the possibility of collision.

The lane changeable distance S may be obtained by the moving distance A by reaction time, the moving distance B by deceleration, and the safety distance C.

When it is determined that there is the possibility of the collision with another vehicle, the vehicle 1 may determine that lane change is impossible, and when it is determined that there is no the possibility of the collision with another vehicle driving the lane to be changed, the vehicle 1 may determine that the lane change is possible.

When it is determined that the lane change is impossible, the vehicle 1 may accelerate or decelerate the driving speed of the vehicle 1.

For example, when changing to the left lane, if it is determined that the lane change is impossible due to another lane driving the rear left, the vehicle 1 may accelerate the driving speed and then determine whether to change the lane again.

In addition, when changing to the left lane, if it is determined that the lane change is impossible due to another lane driving the front left, the vehicle 1 may decelerate the driving speed and then determine whether to change the lane again.

That is, the vehicle 1 may determine whether the lane is changed again after deceleration control or acceleration control of the driving speed of the subject vehicle based on the relative distance and relative speed between the lane to be changed and another vehicle.

When it is determined that the lane change is possible, the vehicle 1 may generate the following line based on the both lanes of the recognized lane, generate a new following line based on the position of the generated following line and a width of another lane. The vehicle 1 may drive along the new following line, but obtain the target steering angle based on the target yaw rate obtained in advance and the yaw rate detected by the yaw rate detector (307).

When it is determined that the lane change is possible, the vehicle 1 may generate the lane change path by generating the new following line based on the previously generated following line and the target steering angle, but generate the lane change path in the form of the cubic equation, and control the steering to drive along the generated lane change path to perform the lane change (308).

When controlling steering for the lane change, the vehicle 1 may perform deceleration control or acceleration control together with the driving speed of the subject vehicle based on the relative distance and relative speed of the lane to be changed and another vehicle.

In addition, when a lane change command is received through the input 240, the vehicle 1 may determine the lane change possibility based on the curvature of the front lane, the curvature of the rear lane, and the position information of another vehicle, and display information about the determined lane change possibility through the display 270 or the sound output 260.

When it is determined that there is the possibility of the collision with another vehicle, the vehicle 1 may output notification information for collision avoidance.

According to the embodiments of the disclosure, the disclosure may reduce a risk of a traffic accident by determining and outputting the lane change possibility through recognition of the rear lane and the obstacle, may improve a stability of driving, and may reduce the driver's tension during autonomous driving control.

The disclosure automatically performs any one of lane change, acceleration control, and braking control on behalf of the driver before the collision with the obstacle occurs, thereby preventing the collision with the obstacle, reducing an incidence of additional injury, and improving the stability of driving.

As described above, the disclosure may flexibly cope with various situations on the road.

The disclosure may recognize the rear lane in a state in which a hardware configuration is not added, thereby preventing an increase in cost due to the addition of a device for recognizing the rear lane.

As described above, the disclosure may improve the quality and marketability of vehicles having ADAS and ADAS, and further enhance user satisfaction and secure product competitiveness.

The disclosed embodiments may be implemented in the form of a recording medium storing computer-executable instructions that are executable by a processor.

The instructions may be stored in the form of a program code, and when executed by a processor, the instructions may generate a program module to perform operations of the disclosed embodiments. The recording medium may be implemented non-transitory as a computer-readable recording medium.

The non-transitory computer-readable recording medium may include all kinds of recording media storing commands that can be interpreted by a computer. For example, the non-transitory computer-readable recording medium may be, for example, ROM, RAM, a magnetic tape, a magnetic disc, flash memory, an optical data storage device, etc.

Embodiments of the disclosure have thus far been described with reference to the accompanying drawings. It should be obvious to a person of ordinary skill in the art that the disclosure may be practiced in other forms than the embodiments as described above without changing the technical idea or essential features of the disclosure. The above embodiments are only by way of example, and should not be interpreted in a limited sense.

What is claimed is:

1. An advanced driver assistance system comprising:
   an image sensor configured to obtain an image of a road and output image data;
   a non-image sensor including a LiDAR sensor and a radar sensor;
   a communication network configured to receive driving data of a vehicle; and
   a controller including a processor configured to process the image data, obstacle data, and data detected by the non-image sensor,
   wherein the controller is configured to:
   obtain position information of another vehicle based on data detected by the non-image sensor;
   recognize a curvature of a front lane based on the image data;
   recognize a curvature of a rear lane based on the driving data;
   determine a lane change possibility of the vehicle based on the recognized curvature of the front lane, the recognized curvature of the rear lane, and the position information of the other vehicle; and
   control an output of a steering control signal based on the determined lane change possibility, and
   wherein the controller is further configured to determine whether a lane on which the other vehicle is driving is the same as a lane to be changed, by comparing the recognized curvature of the front lane to the recognized curvature of the rear lane and using the position information of the other vehicle.

2. The advanced driver assistance system according to claim 1, wherein, in response to determining that a lane change of the vehicle is impossible, the controller is further configured to obtain speed information of the other vehicle and control an output of a deceleration control signal or an acceleration control signal based on the obtained speed information of the other vehicle.

3. The advanced driver assistance system according to claim 1, wherein, in response to determining that a lane change of the vehicle is impossible, the controller is further configured to control an output of notification information for collision avoidance.

4. The advanced driver assistance system according to claim 1, wherein the controller is further configured to obtain a target steering angle based on a target yaw rate obtained in advance and a yaw rate detected by a yaw rate detector, and generate the steering control signal corresponding to the obtained target steering angle.

5. The advanced driver assistance system according to claim 1, wherein the controller is further configured to:
   obtain the speed information of the other vehicle;
   obtain a time to collision (TTC) with the other vehicle based on the obtained speed information and position information; and
   in response to the obtained TTC being greater than or equal to a predetermined reference time, determine that a lane change is possible.

6. The advanced driver assistance system according to claim 1, wherein the controller is further configured to:
   obtain the speed information of the other vehicle;
   obtain a distance to collision (DTC) with the other vehicle based on the obtain speed information; and
   in response to the obtained DTC being greater than or equal to a predetermined reference distance, determine that a lane change is possible.

7. The advanced driver assistance system according to claim 1, wherein the controller is further configured to:
   obtain a distance to the other vehicle based on the obtained speed information and position information;
   obtain a lane changeable distance based on a moving distance by reaction time, a moving distance by deceleration, and a safety distance; and
   in response to the obtained distance exceeding the lane changeable distance, determine that a lane change is possible.

8. The advanced driver assistance system according to claim 1, wherein:
   in response to determining that the recognized curvature of the front lane and the recognized curvature of the rear lane are the same, or a difference between the recognized curvature of the front lane and the recognized curvature of the rear lane is less than a certain value, and determining that the other vehicle is driving in a direction deviated from the vehicle by a certain angle or more, the controller is further configured to determine that the lane on which the other vehicle is driving is different from the lane to be changed, and
   in response to determining that the recognized curvature of the front lane and the recognized curvature of the rear lane are different, or the difference between the recognized curvature of the front lane and the recognized curvature of the rear lane is more than or equal to the certain value, and determining that the other vehicle is driving in the direction deviated from the vehicle by the certain angle or more, the controller is further configured to determine that the lane on which the other vehicle is driving is the same as the lane to be changed.

9. A vehicle comprising:
a camera configured to obtain an image of a road ahead and output image data;
an obstacle detector configured to detect an obstacle and output obstacle data;
a driving information detector configured to detect driving information of the vehicle;
a controller configured to:
obtain position information of another vehicle based on the obstacle data,
recognize a curvature of a front lane based on the image data,
recognize a curvature of a rear lane based on the driving information,
determine a lane change possibility based on the recognized curvature of the front lane, the recognized curvature of the rear lane, and the obstacle data, and
control at least one of steering, deceleration and acceleration based on the determined lane change possibility;
a steering device configured to perform steering in response to a command of the controller;
a braking device configured to perform deceleration in response to the command of the controller; and
an engine configured to perform acceleration in response to the command of the controller,
wherein the controller is further configured to determine whether a lane on which the other vehicle is driving is the same as a lane to be changed, by comparing the recognized curvature of the front lane to the recognized curvature of the rear lane and using the position information of the other vehicle.

10. The vehicle according to claim 9, wherein the controller is further configured to:
obtain the position information of the other vehicle driving on another lane based on the obstacle data;
obtain one of a time to collision (TTC) with the other vehicle, a distance to collision (DTC) with the other vehicle, or a lane changeable distance based on the obtained position information of the other vehicle as information for determining a possibility of collision with the other vehicle.

11. The vehicle according to claim 10, wherein the controller is further configured to:
in response to determining that the other vehicle is driving in another lane ahead, obtain speed information of the other vehicle;
based on the obtained speed information and position information, obtain the TTC with the other vehicle; and
in response to the obtained TTC being greater than or equal to a predetermined reference time, determine that a lane change is possible.

12. The vehicle according to claim 10, wherein the controller is further configured to:
in response to determining that the other vehicle is driving in the same position in a transverse direction but driving in another lane, obtain the speed information of the other vehicle;
obtain a distance to collision (DTC) with the other vehicle based on the obtain speed information; and
in response to the obtained DTC being greater than or equal to a predetermined reference distance, determine that a lane change is possible.

13. The vehicle according to claim 10, wherein the controller is further configured to:
in response to determining that the other vehicle is driving in another lane in the rear, obtain speed information of the other vehicle;
obtain a distance to the other vehicle based on the obtained speed information and position information;
obtain a lane changeable distance based on a moving distance by reaction time, a moving distance by deceleration, and a safety distance; and
based on the obtained distance exceeding the lane changeable distance, determine that a lane change is possible.

14. The vehicle according to claim 9, wherein, in response to determining that a lane change of the vehicle is impossible, the controller is further configured to obtain speed information of the other vehicle and control an output of a deceleration control signal or an acceleration control signal based on the obtained speed information of the other vehicle.

15. The vehicle according to claim 9, further comprising:
at least one of a display and a sound output,
wherein, in response to determining that a lane change of the vehicle is impossible, the controller is configured to control at least one of the display and the sound output to control an output of notification information for collision avoidance.

16. A method of controlling a vehicle comprising:
obtaining, by a camera, an image of a road ahead;
recognizing, by a controller, a curvature of a front lane from the obtained road image;
obtaining, by the controller, position information and speed information of another vehicle based on obstacle information detected by an obstacle detector;
periodically storing, by a storage, driving speed information, yaw rate information, and steering angle information while driving;
recognizing, by the controller, a curvature of a rear lane based on the periodically stored driving speed information, yaw rate information, and steering angle information in response to determining that a lane change is necessary;
determining, by the controller, a lane change possibility based on the recognized curvature of the front lane, the recognized curvature of the rear lane, and the position information and speed information of the other vehicle; and
controlling, by the controller, at least one of steering, deceleration, and acceleration based on the determined lane change possibility,
wherein the determining of the lane change possibility includes:
recognizing a lane in which the other vehicle is driving by comparing the recognized curvature of the front lane to the recognized curvature of the rear lane and using the position information of the other vehicle; and
determining whether the recognized lane of the other vehicle is the same as a lane to be changed.

17. The method according to claim 16, wherein the determining of the lane change possibility further includes:
in response to determining that the recognized lane of the other vehicle is the same as the lane to be changed, determining a possibility of collision;
in response to determining that the possibility of collision exists, determining that the lane change is impossible; and
in response to determining that there is no possibility of collision, determining that the lane change is possible.

18. The method according to claim 16, further comprising:
- in response to determining that the lane change is possible, obtaining, by the controller, a target steering angle based on a target yaw rate obtained in advance and a yaw rate detected by a yaw rate detector; and
- controlling, by the controller, the steering based on the obtained target steering angle.

19. The method according to claim 16, wherein the determining of the lane change possibility includes:
- in response to determining that the other vehicle is driving in another lane in the rear, obtaining the speed information of the other vehicle;
- obtaining a distance to the other vehicle based on the obtained speed information and position information;
- obtaining a lane changeable distance based on a moving distance by reaction time, a moving distance by deceleration, and a safety distance; and
- in response to the obtained distance exceeding the lane changeable distance, determining that the lane change is possible.

20. The method according to claim 16, further comprising:
- in response to receiving a lane change command through an input, determining, by the controller, a lane change possibility based on the recognized curvature of the front lane, the recognized curvature of the rear lane, and the position information and speed information of the other vehicle; and
- outputting, by the controller, information about the lane change possibility through at least one of a display and a sound output.

* * * * *